United States Patent
Lim et al.

(10) Patent No.: US 11,909,577 B2
(45) Date of Patent: Feb. 20, 2024

(54) METHOD AND SYSTEM FOR DETECTING FAILURE-CAUSING CLIENT WITH FAILURE HANDLING EDGE SERVER GROUPING

(71) Applicant: INNOGS KOREA CORP., Seoul (KR)

(72) Inventors: Young Suk Lim, Seoul (KR); Jeong Hoan Seo, Seoul (KR)

(73) Assignee: INNOGS KOREA CORP., Seoul (KR)

( * ) Notice: Subject to any disclaimer, the term of this patent is extended or adjusted under 35 U.S.C. 154(b) by 0 days.

(21) Appl. No.: 18/207,671

(22) Filed: Jun. 8, 2023

(65) Prior Publication Data

US 2023/0318907 A1  Oct. 5, 2023

Related U.S. Application Data

(63) Continuation of application No. 17/636,894, filed as application No. PCT/KR2020/011082 on Aug. 20, 2020, now abandoned.

(30) Foreign Application Priority Data

Aug. 21, 2019 (KR) .................. 10-2019-0102339

(51) Int. Cl.
H04L 41/0631 (2022.01)
H04L 41/0668 (2022.01)

(52) U.S. Cl.
CPC ........ *H04L 41/065* (2013.01); *H04L 41/0668* (2013.01)

(58) Field of Classification Search
None
See application file for complete search history.

(56) References Cited

U.S. PATENT DOCUMENTS

| 10,715,411 B1 * | 7/2020 | Jacob Da Silva .... H04L 67/566 |
| 2004/0162810 A1 | 8/2004 | Jeon |
| 2011/0246835 A1 * | 10/2011 | Hasegawa ........... G06F 11/0748 714/39 |
| 2013/0179969 A1 | 7/2013 | Jungck |
| 2017/0141984 A1 * | 5/2017 | Seo ..................... H04L 43/00 |
| 2021/0073098 A1 * | 3/2021 | Maruyama .......... G06F 11/0709 |

FOREIGN PATENT DOCUMENTS

| JP | 2000-347959 A | 12/2000 |
| JP | 2017-527152 A | 9/2017 |
| KR | 10-2004-0073800 A | 8/2004 |
| KR | 10-2013-0103145 A | 9/2013 |
| KR | 10-2015-0049342 A | 5/2015 |
| KR | 10-1569857 B1 | 11/2015 |

* cited by examiner

*Primary Examiner* — Mohamed Ibrahim
(74) *Attorney, Agent, or Firm* — INVENSTONE PATENT, LLC

(57) ABSTRACT

Provided is a client terminal access control method, and the method includes: allocating a communication process of a first client group comprising a plurality of client terminals to an edge server; when a failure occurs in an operation of the edge server, allocating a communication process of a second client group comprising at least one client terminal belonging to the first client group to a failure-handling edge server; and determining whether a failure occurs in an operation of the failure-handling edge serve.

11 Claims, 18 Drawing Sheets

METHOD AND SYSTEM FOR DETECTING FAILURE-CAUSING CLIENT WITH FAILURE HANDLING EDGE SERVER GROUPING

CROSS-REFERENCE TO RELATED APPLICATIONS

This application is a continuation of U.S. patent application Ser. No. 17/636,894, filed on Feb. 20, 2022, which is a National Stage filing under 35 U.S.C. 371 of International Application No. PCT/KR2020/011082, filed on Aug. 20, 2020, which claims the benefit of earlier filing date and right of priority to Korean Application No. 10-2019-0102339, filed on Aug. 21, 2019 in the Korean Intellectual Property Office, the contents of which are all hereby incorporated by reference herein in their entirety.

BACKGROUND OF THE DISCLOSURE

Field of the Disclosure

The present disclosure relates to detection of a client causing a network failure and, more particularly, to a method and a system for detecting a failure-causing client with failure-handling edge server grouping to detect a failure-causing client, which causes a network failure, through grouping of failure-handling edge servers.

Related Art

Detecting a network failure-causing client using a client route control system, for example, identifying an Internet Protocol (IP) of a distributed denial-of-service (DDoS) attacker may refer to designating an edge server to be accessed by a user using several edge servers, a client route control server, and a domain name server (DNS) to detect and identify a DDoS attack by controlling a client route.

DDoS attacks may be generally classified into two types. The first-type DDoS attack may paralyze the server by burdening the server with an excessive load. When such an attack occurs, the server may be paralyzed by failing to process other jobs due to an excessive load thereon.

The second-type DDoS attack may disable a network line by overflowing the network line with traffic. When such an attack takes place, there is no problem with the server but a network line connected to the server is disabled, and thus, the server and the client may not communicate with each other. That is, even if there is no problem with the server, a problem may happen in the network, so it may be difficult to maintain a service. Despite many DDoS security technologies developed to address the above-described situation, none of them is considered a permanent solution. Although the conventional DDoS security technologies are capable of blocking a DDoS attack, but it is not possible to search for and identify the IP of a DDoS attacker.

In addition, if an attacked line or IP range is blocked in order to block a DDoS attack, even a normal user belonging to the corresponding line or range may not use a service. This may cause a time loss and an excessive cost in financial institutions, public institutions, and service providers, such as game service providers, that should continuously maintain a service 24 hours a day.

In order to solve this problem, there is provided a related art (Korean Patent No. 10-1569857, published on Nov. 11, 2015) relating to a method for searching and detecting a network failure-causing client, the method in which a network failure-causing client is searched and detected in a way that provides each client with a unique route which is configured by combining several routes using edge servers arranged in a plurality of stages.

When there is a single client that causes a network failure, the above-described related art relating to a method for detecting a failure-causing client using a client route control system has no difference compared to the present disclosure; however, the related art has a possibility that false detection can happen when a network failure occurs in several clients simultaneously.

For example, according to the related art, if an edge server IP allocation matrix for detecting a failure-causing client is configured in a 3×2 matrix array in an edge server group including six edge servers, the edge server IP allocation matrix may be configured as shown in FIG. 11. There are six edge servers including edge servers 1 to 6 in the edge server group, and if edge servers are allocated to clients using a 3×2 matrix and the six edge servers, eight clients A to H may be identified. That is, the edge server 1 is allocated to the clients A to D, and the edge server 4 is allocated to the clients E to H. In addition, when a failure occurs in the edge server 1, the edge server 2 is allocated to the clients A and B and the edge server 5 is allocated to the clients C and D according to the edge server IP allocation matrix. When a failure occurs in the edge server 5, the edge server 3 is allocated to the client C and the edge server 6 is allocated to the client D according to the edge server IP allocation matrix. Then, when a failure has occurred in the client 6, the client D is detected as a failure-causing client.

However, as shown in FIG. 12, when the clients A and F cause a failure simultaneously, the failure occurs in the edge servers 1 and 4, in the edge server 2, and then in the edge servers 3 and 6 in order according to the edge server IP allocation matrix. In conclusion, when the clients A and F simultaneously cause a failure, the failure occurs in the edge servers 1, 2, 3, 4, and 6. In this case, the client B having the edge servers 1, 2, and 6 allocated thereto and the client E having the edge servers 4, 2, and 3 allocated thereto are also detected as failure-causing clients. That is, the clients that have actually caused the failure are the clients A and F, but the clients B and E are also recognized as the failure-causing clients.

SUMMARY

The present disclosure provides a method and a system for detecting a failure-causing client with failure-handling edge server grouping by repeatedly performing a process in which when a failure occurs in an edge server, the edge server having the failure is replaced by a failure-handling edge server sub-group selected from a failure-handling edge server group comprising a plurality of failure-handling edge servers, and when a failure occurs in the replaced failure-handling edge server, the replaced failure-handling edge server is replaced by a failure-handling edge server, so that a failure-causing client which causes a network failure is detected and hence a service server is no longer affected by the network failure.

In one aspect of the present disclosure, a method for detecting a failure-causing client with failure-handling edge server grouping is provided. The method includes: checking where a failure occurs in the edge server in a network in which a plurality of edge servers exist on a route through which a client accesses a service server; when a failure occurs in the edge server, providing clients connected to the edge server having the failure with failure-handling edge servers (a failure-handling edge server sub-group), which is selected from a failure-handling edge server group comprising a plurality of failure-handling edge servers and of which a number is more than a number of edge servers having the failure, by replacing the edge server having the failure with the failure-handling edge servers; when a failure occurs in the replaced failure-handling edge servers according to a result of the checking, providing the clients with a failure-handling edge server sub-group selected from the failure-handling edge server group, by replacing the replaced failure-handling edge servers with the failure-handling edge server sub-group; and whenever a failure occurs in a failure-handling edge server, replacing the failure-handling edge server having the failure with a failure-handling edge server sub-group selected from a failure-handling edge server group, and when there is a single client allocated to the failure-handling edge server having the failure, detecting the single client as a failure-causing client.

When a failure occurs in the edge server or failure-handling edge server, a number or access history of clients allocated to the edge server or failure-handling edge server having the failure may be analyzed and the failure-handling edge server sub-group may be configured as a plurality of failure-handling edge servers based on a number of unallocated failure-handling edge servers in the failure-handling edge server group. The checking of whether a failure occurs in the edge server or failure-handling edge server may be performed when a DNS query is received from a client or may be performed by monitoring whether a failure occurs in the edge server or failure-handling edge server, regardless of whether the DNS query is received from the client.

In another aspect of the present disclosure, a method for detecting a failure-causing client with failure-handling edge server grouping is provided. The method includes: when a failure occurs in an edge server or a failure-handling edge server, searching for a client IP or user information using the edge server or failure-handling edge server having the failure; and when a DNS query request is received, providing the found client with a failure-handling edge server selected from the failure-handling edge server group.

The clients may each include an agent configured to transmit a DNS query to connect to a failure-handling edge server selected from a failure-handling edge server group when a failure occurs in the edge server or failure-handling edge server, and the agent may request a DNS query including user information, extract user information from a DNS query of a client when the DNS query is received from an agent of the client, and provide the client with an IP of a failure-handling edge server selected from the failure-handling edge server group and corresponding to the extracted user information.

In yet another aspect of the present disclosure, a system for detecting a failure-causing client with failure-handling edge server grouping is provided. The system includes: an edge server group including a plurality of edge servers existing on a route through which a client accesses to a service server; a failure-handling edge server group including failure-handling edge servers, which exist in the route through which the client accesses to a server and replace the edge servers when a failure occurs in the edge servers, and other failure-handling edge servers, which replaces the failure-handling edge servers, wherein the failure-handling edge server group includes a failure-handling edge server sub-group which when a failure occurs in an edge server or a failure-handling edge server, includes failure-handling edge servers in number greater than a number of the edge servers or the failure-handling edge servers having the failure; a DNS controller configured to, in response to a DNS query requested by a client, provide an edge server IP or a failure-handling edge server IP for each client IP or user information; a failure check unit configured to check whether a failure occurs in an edge server or a failure-handling edge server; and an edge server controller configured to when a failure occurs in an edge server or a failure-tolerant edge server, provide clients with the failure-failure edge server sub-group selected from the failure-handling edge server group by replacing the edge server or the failure-handling edge server having the failure, and when there is a single client allocated to the failure-handling edge server, detect the single client as a failure-causing client.

The failure check unit may check whether a failure occurs in an edge server or a failure-response edge server provided to the DNS controller by the edge server controller in response to a DNS query. In this case, when no failure occurs in the edge server or failure-handling edge server, the DNS controller provides a client with information on the edge server or failure-handling edge server through a DNS server.

The failure check unit may monitor whether a failure occurs in the edge server or failure-handling edge server, regardless of a DNS query. In this case, when a failure occurs in the edge server or failure-handling edge server, the edge server controller may search for a client IP or user information using the edge server or the fault-response edge server having the failure and allocate an IP of a failure-handling edge server IP from the failure-response edge server group to the found client IP or user information. When a DNS query is requested by a client corresponding to the found client IP or user information, the DNS controller may provide the IP of the failure-handling edge server allocated by the edge server controller to the found client through the DNS server or may provide an IP of a failure-handling edge server allocated by the edge server controller to the found client through the DNS server, regardless of the DNS query.

The client may include an agent configured to, when a failure occurs in an edge server or a failure-handling edge server, transmit a DNS query including user information to be connected to a failure-handling edge server selected from the failure-handling edge server group. In this case, when a DNS query is received from the agent of the client, the edge server controller may extract user information from the DNS query of the client. The edge server or the failure-handling edge server may include at least one of a program, a server, and a hardware equipment, which connect a client and a server and have a service relay function or a service function.

In yet another aspect of the present disclosure, a client terminal access control method performed by a client terminal access control apparatus is provided. The client terminal access control method includes: allocating a communication process of a first client group including a plurality of client terminals to an edge server; when a failure occurs in an operation of the edge server, allocating a communication process of a second client group generated by dividing the first client group to a failure-handling edge server; and determining whether a failure occurs in an operation of the failure-handling edge server.

When a failure occurs in the operation of the failure-handling edge server and there are a plurality of client terminals allocated to the failure-handling edge server, a communication process of a sub client group generated by dividing a client group allocated to the failure-handling edge server may be allocated to a failure-handling edge server.

When a failure occurs in the operation of the failure-handling edge server and there is a single client terminal allocated to the failure-handling edge server, the single client terminal may be determined as a failure-causing client terminal.

In yet another aspect of the present disclosure, a client terminal access control apparatus is provided. The client terminal access control apparatus includes: a communication unit configured to perform data communication with an edge server and a failure-handling edge server; and a processor configured to: allocate a communication process of a first client group including a plurality of client terminals to an edge server, when a failure occurs in an operation of the edge server, allocate a communication process of a second client group generated by dividing the first client group to a failure-handling edge server, and determine whether a failure occurs in the operation of the failure-handling edge server.

When a failure occurs in the operation of the failure-handling edge server and there is a plurality of client terminals allocated to the failure-handling edge server, the processor may allocate a communication process of a sub client group generated by dividing a client group allocated to the failure-handling edge server. When a failure occurs in the operation of the failure-handling edge server and there is a single client terminal allocated to the failure-handling edge server, the processor may determine the single client terminal as a failure-causing client terminal.

In yet another aspect of the present disclosure, a program to be executed by a processor and a recording medium to be read by a processor in which the program is recorded are provided.

In the method and system for detecting a failure-causing client with failure-handling edge server grouping according to the present disclosure, it is possible to detect a failure-causing client which causes a network failure so that a service server is no longer affected by a service failure due to the network failure. Therefore, the continuity of a service provided to a client may be guaranteed, and the client may constantly maintain network communication through a failure-handling edge server even if a failure occurs in some routes.

In addition, according to the present disclosure, by replacing the failure edge server and the failure-handling edge server, each server at which a failure occurs, with a failure-handling edge server sub-group to accurately detect a failure-causing client, it is possible to easily identify a DDoS attacker IP and block a DDoS attack. That is, by dynamically allocating an edge server or a failure-handling edge server for each client to the failure-handling edge server sub-group, it is possible to immediately discover a failure-causing client when a failure occurs in the edge server or failure-handling edge server. In doing so, only the failure-causing client is blocked and thus a user who is normally using a service is not affected. In addition, since an amount of time to analyze a log for DDoS detection is reduced, a time loss may be reduced.

According to the present disclosure, since a route is designated based on client information, it is universal. In other words, according to the present disclosure, since a route is designated based on client information, any method used by a client is applied to a route designating system and thus a route suitable for the method is used. This may be very universal compared to ACL or Null Routing technique that performs filtering only based on IP or Port In addition, according to the present disclosure, it is possible to block various types of DDoS attacks. In the present disclosure, a client may not directly connect to a server by using an edge server or a failure-handling edge server. This means that it is not possible for a DDoS attacker to directly interfere with the server, so it is not possible to carry out a DDoS attack directly on the server. Even if the DDoS attacker carries out an attack on a network line, the DDoS attacker is the only one connected to the corresponding line and thus it is possible to block the corresponding line so that the DDoS attack can be blocked without influence on other network lines. Considering that the DDoS attacker can be detected using a small number of edge servers, it is possible to greatly reduce the cost for security maintenance and the manpower and time loss required for equipment and management.

In addition, the edge server and the failure-handling edge server according to the present disclosure may be implemented as substantially the same hardware/software configurations, so that a system administrator may adaptively manage the configurations of the edge server and the failure-handling edge server according to a network environment. More specifically, in order to provide sufficient traffics to client terminals connected to a network, some failure-handling edge servers may be used as edge servers. Similarly, when it is presumed that a plurality of failure-causing clients is included in the client terminals connected to the network, some edge servers are converted to and used as failure-handling edge servers for the purpose of network stability, and thus, it is possible to quickly select a failure-causing client from the client terminals.

As described above, in the method for detecting a failure-causing client according to the present disclosure, a time complexity required to detect a failure-causing client connected to one edge server may be calculated as $O(\log_s n)$, thereby providing a fast and stable failure-causing client detection environment. Here, s indicates the number of failure-handling edge servers, and n indicates the number of clients connected to an edge server.

DESCRIPTION OF EXEMPLARY EMBODIMENTS

Figure 1:
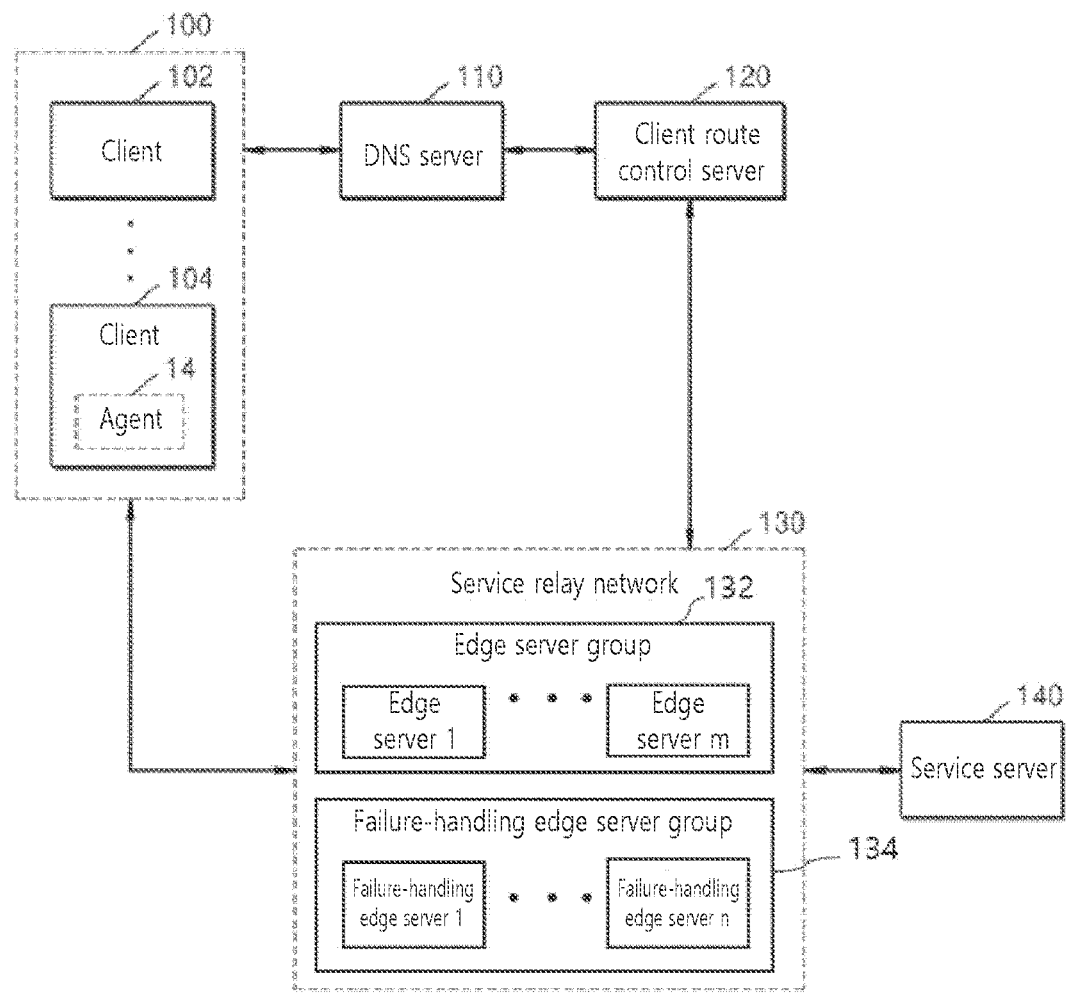
FIG. 1 is a block diagram showing an example of the configuration of an entire system to which the present disclosure is applied.

Hereinafter, embodiments of the present disclosure will be described in detail with reference to the accompanying drawings. The embodiments described in this specification and the configurations shown in the drawings are just preferable examples of the present disclosure and are not intended to limit the scope of the disclosure, so it should be understood that other equivalents and modifications could be made thereto without departing from the spirit and scope of the disclosure.

FIG. 1 is a block diagram showing an example of the configuration of an entire system to which the present disclosure is applied. A system to which the present disclosure is applied includes a plurality of clients 100, a DNS server 110, a client route control server 120, a service relay network 130, and a service server 140.

In the present disclosure, the service relay network 130 may include an edge server group 132 and network equipment such as a gateway, a router, a switch and a hub, and the edge server group 132 may consist of a plurality of edge servers each including a server or hardware equipment having a service relay function or a service function. In addition, the service relay network 130 includes a failure-handling edge server group 134 that, in response to occurrence of a failure in an edge server, detects a failure-causing client while replacing the failing edge server.

In general, a network may include various servers such as a web server and a DNS, and network equipment such as a gateway, a router, a switch, and a hub. Among them, a server mainly plays a role of receiving a request from a client and resolving the request, and the network equipment plays a role of delivering a packet to be transmitted or received by the client. Such equipment delivers the packet received from the client to the server without a loss through a route with a fast transmission time, and the server quickly processes the request from the client and transmits a processing result to the client. However, when there is a problem with equipment or a network line, the equipment is lacking in the ability to cope with the problem and show a weakness.

The edge server used in the present disclosure may be implemented as a server and hardware equipment having a service relay function or a service function, such as a proxy server, a cache server, etc. for the purpose of realization of the present disclosure. In addition, the edge server may be a program having a service relay function or a service function, and may be used as a service route to be accessed by a client and may serve as a service server to be accessed by the client.

When the clients 100 access the server, most clients connect to the service server 140 using a DNS. The present disclosure includes an edge server, a failure-handling edge server, and a client route control server (hereinafter referred to as CRCS) 120 that manages the edge server.

A client 100 accesses the service server 140 to receive a service, and at this point, an IP of the service server 140 is first provided through the DNS server 110. To this end, the client 100 transmits a DNS query to the DNS server 110.

The DNS server 110 receives a DNS query from the client 102 or and 104 and, if an IP of the corresponding service server is not included in the DNS query, the DNS server 110 transmits the DNS query to the client route control server 120.

The client route control server 120 receives a DNS query of the clients from the DNS server 110, allocates and provides each client with an IP of an edge server belonging to the service relay network 130, and transmits the IP of the allocated edge server to the DNS server 110 to a corresponding client.

The CRCS 120 will be described in more detail. The CRCS 120 checks the status of each of the edge servers and the failure-handling edge servers, and manages data of clients, the edge servers, and the failure-handling edge servers. Then, the CRCS 120 designates an edge server IP or failure-handling edge server IP for each client and delivers the same to a corresponding client. The CRCS 120 may receive a DNS request, check the status of each of the edge servers and the failure-handling edge servers, designate a client IP or an edge server IP or failure-handling edge server IP corresponding to the client IP, store information on the designation, and transmit a DNS response.

A client 100 requesting a DNS query receives IP of an edge server or a failure-handling edge server and connects to the edge server or failure-handling edge server to receive a service from the service server 140.

More specifically, the client 100 requests a DNS query from the DNS server 110 in order to find an address of the server. When the DNS server 110 does not have a domain name requested by the client, the DNS server 110 requests an upper-level DNS server to search for an IP corresponding to the domain name.

The DNS server 110 will be described in more detail. The DNS server 110 may be general DNS equipment that receives a domain name requested by a client and responds with an IP corresponding to the domain name and may also include a concept or technology corresponding thereto. The DNS server 110 transmits an IP corresponding to the domain name to the client. Through the above-described process, the DNS query comes to the CRCS 120 having the domain name requested by the client 100 and the client IP. At this point, the CRCS 120 prepares an edge server IP or failure-handling edge server IP used for the unique route for each client IP according to the route control algorithm.

Figure 2:
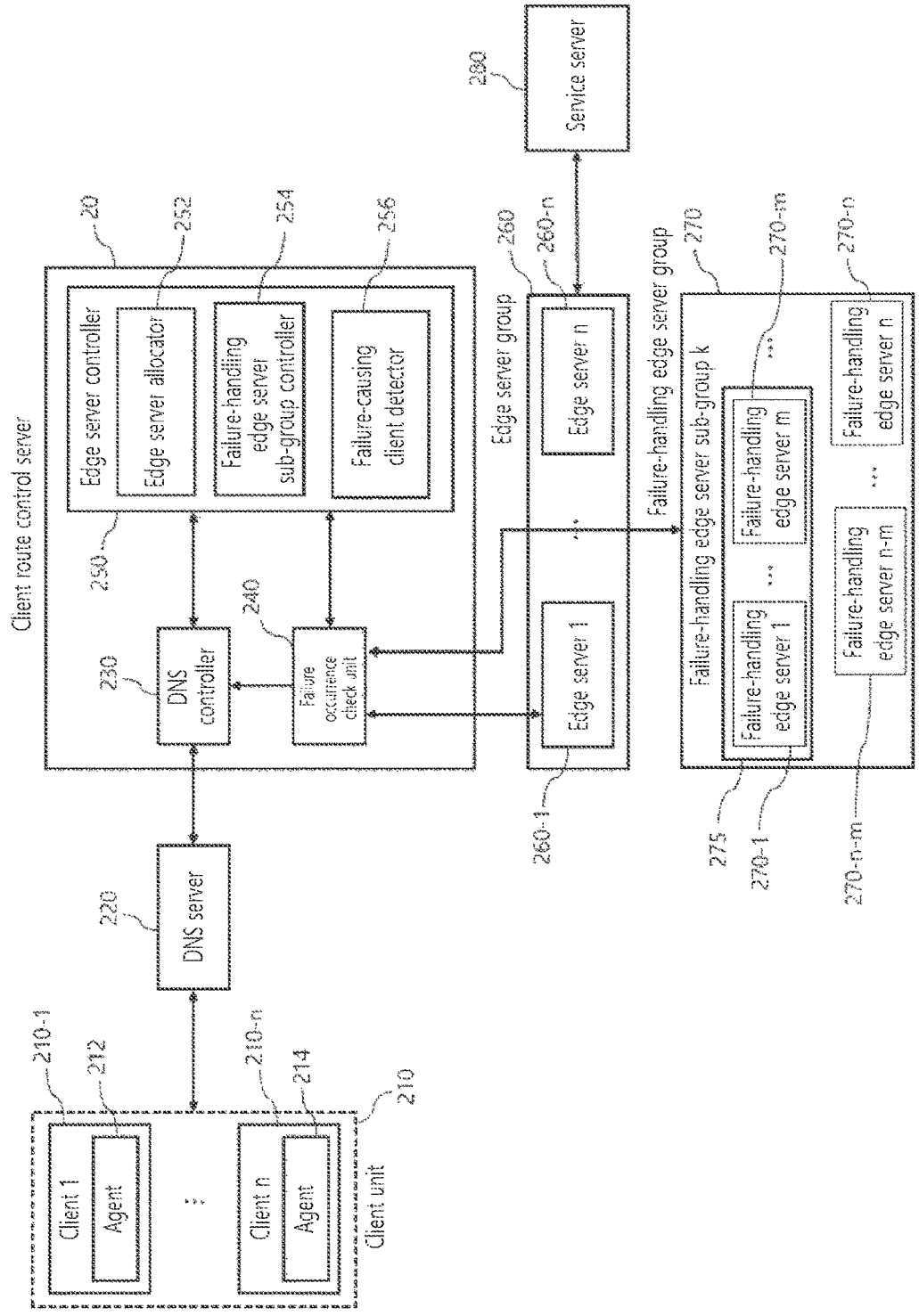
FIG. 2 is a block diagram showing the configuration of a system for detecting a failure-causing client with failure-handling edge server grouping according to an embodiment of the present disclosure.

FIG. 2 is a block diagram showing the configuration of a system for detecting a failure-causing client with failure-handling edge server grouping according to an embodiment of the present disclosure. Referring to FIG. 2, an embodiment of the failure-causing client detection system 20 with failure-handling edge server grouping according to the present disclosure includes an edge server group 260, a failure-handling edge server group 270, and a client route control server 20.

The edge server group 260 includes a plurality of edge servers 260-1 and 260-n exists on a route through which a client 210 accesses a service server 280. The edge server group 260 is a group of edge servers each monitoring traffics between a client and the service server and transmitting a packet from the client to the service server. An edge server may accommodate connection of one or more clients, and when a client connects to the service server for the first time, an edge server in the edge server group is allocated.

The failure-handling edge server group 270 includes failure-handling edge servers 270-1, 270-m, 270-n-m, and 270-n, which exist on a route through which the client 210 accesses the service server 280 and replace edge servers 260-1 and 260-n when a failure occurs in the edge servers 260-1 and 260-n, and other failure-handling edge servers 270-1, 270-m, 270-n-m, and 270-n which replace the failure-handling edge servers. In addition, the failure-handling edge server group 270 may include a failure-response edge server subgroup 275 which is configured, when a failure occurs in edge servers or failure-handling edge servers, with failure-response edge servers 270-1 and 270-m in number greater than the number of the edge servers or failure-handling edge servers having the failure.

The failure-handling edge server group 270 is a set of failure-handling edge servers allocated to detect a failure-causing client when a client allocated to and used by an edge server where a failure occurs is allocated with an edge server again. A failure-handling edge server may accept connection of one or more clients. The failure-response edge server is not allocated under normal circumstances, but is allocated when edge server allocation is requested by a client allocated to an edge server of which a failure is detected by the failure check unit 240 of the client route control server 20.

When the failure-handling edge server actually handles with a failure, the entire failure-handling edge server group 270 does not proceed, but a failure-handling edge server sub-group is logically generated by the edge server controller 250 of the client route control server 20 through a failure-handling edge server sub-group control mechanism and edge servers are added to the failure-handling edge server sub-group, and then the failure-handling edge servers in the failure-handling edge server sub-group are allocated.

The failure-handling edge server sub-group 275 is a virtual failure-handling edge server group logically created within the failure-handling edge server group 270. When an edge server actually fails and the response starts as a failure-handling edge server, it responds to failure. Instead of allocating the entire edge server group as a target, the failure-handling edge server sub-group control mechanism of the edge server controller 250 creates a virtual failure-handling edge server sub-group, and the number and connection of clients already allocated to the edge server in failure After analyzing the records, selecting an appropriate number in consideration of the number of unallocated failure-handling edge servers in the failure-handling edge server group, and allocating them to a virtual created failure-handling edge server sub-group, through the edge server grouping allocation mechanism It is allocated to the failure-handling edge server in the created failure-handling edge server sub-group 275.

The failure-handling edge server sub-group that has completed a failure-handling process is deleted, and the failure-handling edge servers allocated therein are placed in an unallocated state in the failure-handling edge server group. The failure-handling edge server sub-group may be implemented as a virtual group that is generated only at a time in need of handling a failure of an edge server and deleted when the failure-handling finishes.

An edge server and a failure-handling edge server are servers that control traffic between a client and the service server, and transmit connection information between a client 210 and the service server 280, system information of the edge server itself (a CPU, a memory, a network, storage usage, a usage rate, etc.), information related to occurrence of a failure, and the like to the client route control server 20. In a general situation, the client is connected to the service server 280 through the edge server, and in a failure state, the client is connected to the service server 280 through the failure-handling edge server. The edge server and the failure-handling edge server have the same configuration.

The client route control server 20 controls a route path so that a communication route between a client and a service server can proceed through the edge server. The client route control server 20 allocates an edge server and a failure-handling edge server in response to a request from the client through the DNS and receives communication-related information (access, system status, and traffic-related information) from the edge server and the failure-handling edge server to checks whether a failure occurs and to detect a failure-causing client. In addition, the client route control server 20 manages a blacklist of failure-causing clients and blocks a service server access by a DNS request from any client registered in the blacklist through the DNS. The client route control server 20 includes a DNS controller 230, a failure check unit 240, and an edge server controller 25. Accordingly, the client route control server 20 may be able to serve even as a client terminal access control apparatus for controlling an access of a client terminal.

In response to a DNS query requested by the client 100, the DNS controller 230 provides an edge server IP or a failure-handling edge server IP for each client IP or user information. That is, when a DNS request from a client is received from the DNS server 220, the DNS controller 230 requests edge server allocation from the client route control server 20, receives a result of edge server allocation from the edge server controller 250, and transmits the result to the DNS server 220.

The failure check unit 240 checks occurrence of a failure in an edge server and a failure-handling edge server, and receives communication-related information such as connection-related information, system state information, and traffic-related information from the edge server and the failure-handling edge server to check if a failure occurs in the corresponding edge server (including the failure-handling edge server). In addition, when it is determined that a failure occurs in the corresponding edge server (including the failure-handling edge server) according to a failure-related policy, the failure check unit 240 transmits the determination result to the edge server controller 250.

In addition, in response to a DNS query, the failure check unit 240 may check whether there is a failure in an edge server or failure-handling edge server provided to the DNS controller 230 by the edge server controller 250. At this point, when no failure occurs in the provided edge server or failure-handling edge server, the DNS controller 230 provides information on the provided edge server or failure-handling edge server to the client 210 through the DNS server 220.

In addition, regardless of the DNS query, the failure check unit 240 may monitor whether there is a failure in an edge server or failure-handling edge server. At this point, the edge server controller 250 searches for client IP or user information of a client or user who is using the edge server or failure-handling edge server where the failure occurs, and the edge server controller 250 allocates an IP of a failure-handling edge server selected from the failure-handling edge server group 270 to the found client IP or user information. At this point, when a client corresponding to the retrieved client IP or user information requests a DNS query, the DNS controller 230 may provide the failure-handling edge server IP allocated by the edge server controller 250 to the found client 100 through the DNS server 220. In addition, regardless of the DNS query, the DNS controller 230 may provide the failure-handling edge server IP allocated by the edge server controller 250 to the found client 100 through the DNS server 220.

When a failure occurs in an edge server or failure-handling edge server, the edge server controller 252 provides the failure-handling edge server subgroup 275 selected from the failure-handling edge server group 270 to clients by replacing the edge server or failure-handling edge server having the failure. When there is a single client allocated to the failure-handling edge server, the edge server controller 252 detects the single client as a failure-causing client. The edge server controller 252 includes an edge server allocator 252, a failure-handling edge server sub-group controller 254, and a failure-causing client detector 256.

When a DNS request from a client 210 is received through the DNS controller 230, the edge server allocator 252 allocates edge servers in the edge server group through an edge server grouping allocation mechanism. When a failure-causing client is identified through the failure-causing client detection mechanism, the edge server allocator 252 adds the corresponding client to the blacklist. After the failure-causing client is detected, the edge server allocator 252 allocates clients allocated to the failure-handling edge server to empty edge servers in the edge server group. When a DNS request is received from a client registered in the blacklist, the edge server allocator 252 does not allocate an edge server or failure-handling edge server.

When a DNS request is received from a corresponding client after an edge server failure is found by the failure check unit 240, the failure-handling edge server sub-group controller 254 logically generates the failure-handling edge server sub-group 275 through a failure-handling edge server sub-group control mechanism to detect a failing client in the failure-handling edge server group 270 and allocates a failure-handling edge server to the failure-handling edge server sub-group 275. Then, the failure-handling edge server sub-group controller 254 allocates a failure-handling edge server to a failure-handling edge server sub-group 275 logically generated through an edge server grouping allocation mechanism.

The failure-causing client detector 256 discovers a failure-causing client by analyzing an allocation status of a failure-handling edge server and information on the corresponding client through a failure-causing client detection mechanism.

When a failure occurs in an edge server or failure-handling edge server, a client unit 210 may include an agent 212 or 214 that transmits a DNS query including user information to re-connect to the failure-handling edge server selected from the failure-handling edge server group. At this point, when the DNS query is received from the agent 212 or 214 of the client, it the edge server controller 250 extracts the user information from the DNS query of the client.

The client unit 210 may be configured as a client accessing the service server 280 and may include a client in which an agent is installed. The agent includes user information of the client and requests information on the service server 280 from the DNS. The agent receives information on an edge server or failure-handling edge server and transmits the information to an Internet application of the client.

Edge servers 260-1 and 260-n or failure-handling edge servers 270-1, 270-m, 270-nm, and 270-n according to an embodiment of the present disclosure may each connect the client 100 with the service server 280 and may be implemented as a program, a server, or hardware equipment having a service relay function or a service function, such as a proxy server and a cache server. The edge servers 260-1 and 260-n or the failure-handling edge servers 270-1, 270-m, 270-nm, and 270-n may each be used as a service route to be accessed by the client and may serve as a service server to be accessed by the client.

In addition, the edge server group 260 and the failure-handling edge server group 270 may form a service relay network, and the service relay network may include network equipment, such as an edge server, a failure-handling edge server, a gateway, a router, a switch, a hub, and the like which includes the concept of a server or equipment with a service relay function or a service function.

Figure 3:
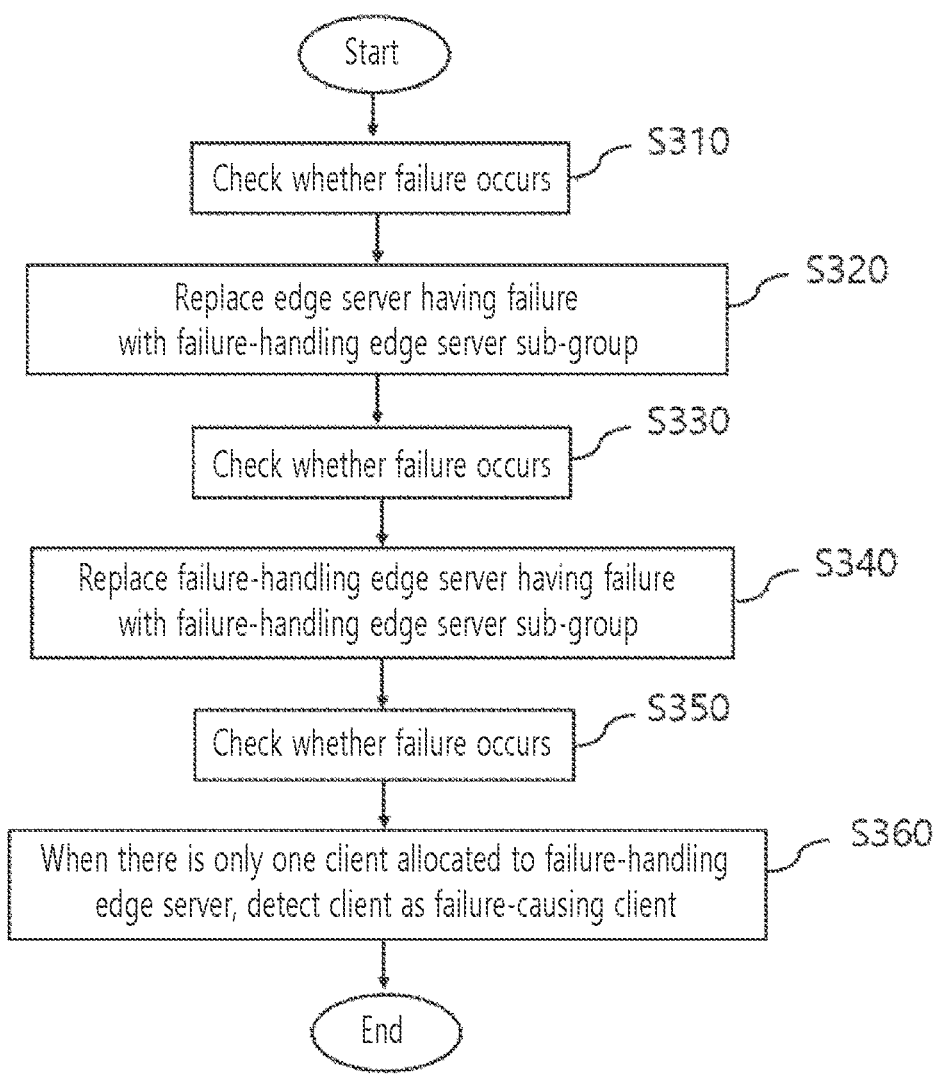
FIG. 3 is a flowchart illustrating a method for detecting a failure-causing client with failure-handling edge server grouping according to an exemplary embodiment of the present disclosure.

FIG. 3 is a flowchart illustrating a method for detecting a failure-causing client with failure-handling edge server grouping according to an exemplary embodiment of the present disclosure. A method for detecting a failure-causing client with failure-handling edge server grouping according to a temporary example will be described with reference to FIGS. 1 to 3.

First, in the service relay network 130 in which a plurality of edge servers exist on a route through which the client 210 accesses the service server 280, the failure check unit 240 checks whether a failure occurs in any edge server in operation S310. As a result of the failure occurrence check, when a failure occurs in any edge server, the edge server controller 250 provides a failure-handling edge server sub-group 275, which is selected from the failure-handling edge server group 27 and composed of failure-handling edge servers in number greater than the number of edge servers having the failure, to clients connected to the edge servers having the failure by replacing the edge servers having the failure in operation S320.

Then, the failure check unit 240 checks whether a failure occurs in the failure-handling edge servers provided to the clients, in operation S330. As a result of the failure occurrence check, when a failure occurs in the replaced failure-handling edge servers, the edge server controller 250 provides another failure-handling edge server sub-group, belonging to the failure-handling edge server group 270 and not provided to the clients, to the clients to replace the failure-handling edge servers having the failure in operation S340. Here, when a failure occurs in an edge server or failure-handling edge server, the number and connection records of clients allocated to the edge server or failure-handling edge server having the failure may be analyzed and the failure-handling edge server sub-group 275 may be composed of a plurality of failure-handling edge servers based on the number of edge servers not allocated from the failure-handling edge server group.

The failure check unit 240 checks whether a failure occurs in the failure-handling edge servers provided to the clients in operation S350. Whenever a failure occurs in any failure-handling edge server, the edge server controller 250 generates a failure-handling edge server sub-group, which is not provided to the clients from the failure-handling edge server group 270 to replace the failure-handling edge server having the failure. At this point, when there is a single client allocated to the failure-handling edge server having the failure, the edge server controller 250 detects the single client as a failure-causing client in operation S360.

The checking of whether a failure occurs in the edge server or failure-handling edge server may be performed by monitoring the occurrence of the failure in the edge server or failure-handling edge server when a DNS query is received from a client or regardless of whether the DNS query is received from the client.

Figure 4:
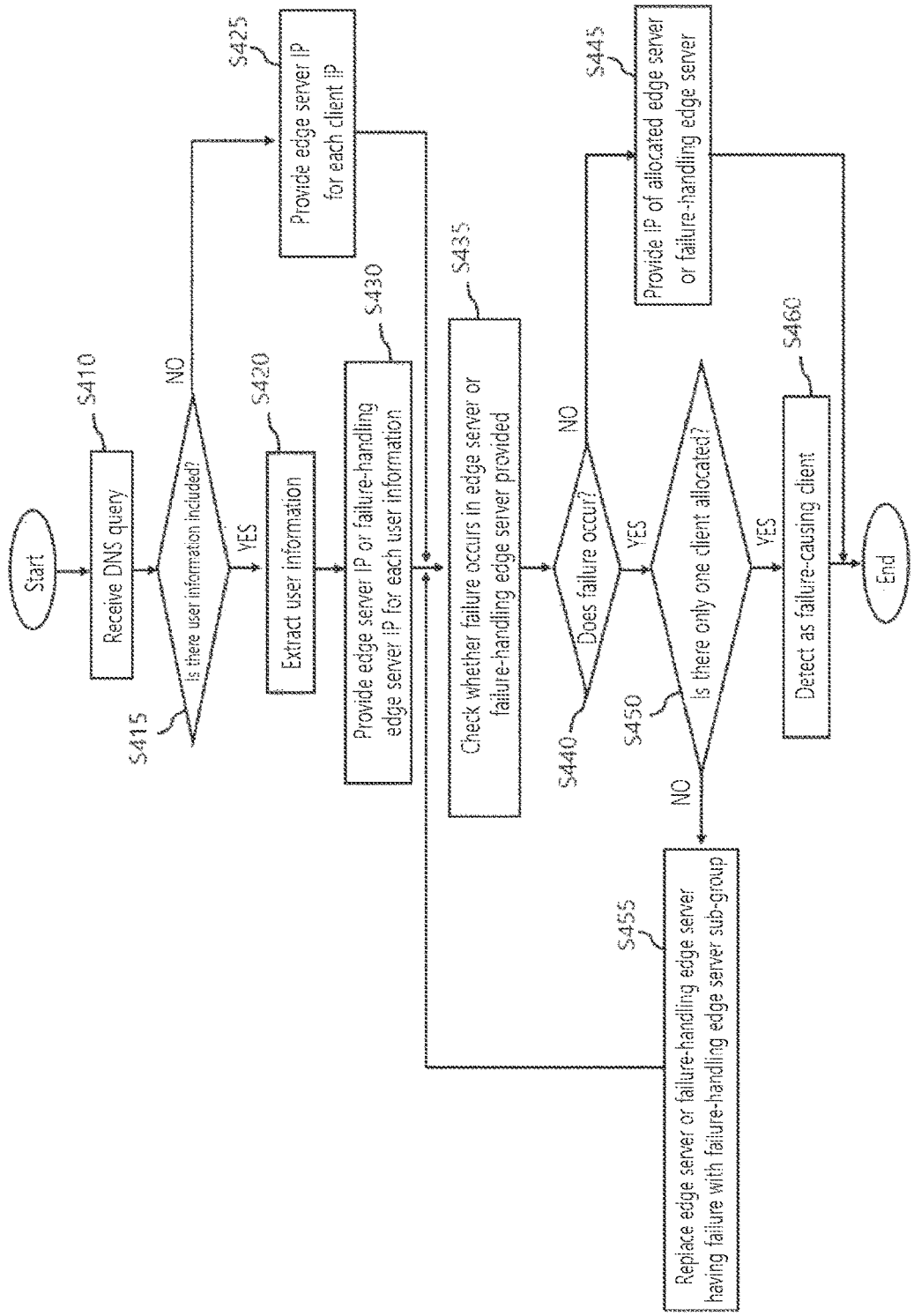
FIG. 4 shows a flow chart illustrating an example in which a failure-causing client is detected by checking whether a failure occurs in the edge server or failure-handling edge server in response to reception of a DNS query from a client and replacing the edge server or failure-handling edge server having the failure with a failure-handling edge server sub-group.

FIG. 4 shows a flow chart illustrating an example in which a failure-causing client is detected by checking whether a failure occurs in the edge server or failure-handling edge server in response to reception of a DNS query from a client and replacing the edge server or failure-handling edge server having the failure with a failure-handling edge server subgroup. Referring to FIGS. 2 and 4, the DNS controller 230 receives a DNS query from the DNS server 220 in operation S410, and checks whether user information is included in the received DNS query in operation S415. When the user information is included in the received DNS query, the DNS controller 230 extracts the user information in operation S420.

In the edge server controller 250, the edge server allocator 252 allocates an edge server IP corresponding to the extracted user information in operation S430.

Meanwhile, when the user information is not included in the DNS query in operation S415, the edge server allocator 252 provides an edge server IP allocated to a client requesting the DNS query in operation S425.

When the edge server IP is allocated, the failure check unit 240 checks whether a failure occurs in the allocated edge server in operation S435.

As a result of the check by the failure check unit 240 in operation S440, when no failure occurs, the edge server IP allocated by the edge server allocator 252 or the failure-handling edge server IP is provided in operation S445.

When a failure has occurred, it is checked whether there is a single client allocated to the edge server or failure-handling edge server in operation S450. When there is a single client allocated to the edge server or failure-handling edge server, the corresponding client is detected as a failure-causing client in operation S460. When there is a plurality of clients allocated to the edge server or failure-handling edge server, an edge server or failure-handling edge server having the failure is replaced by a failure-handling edge server group in operation S455.

Figure 5:
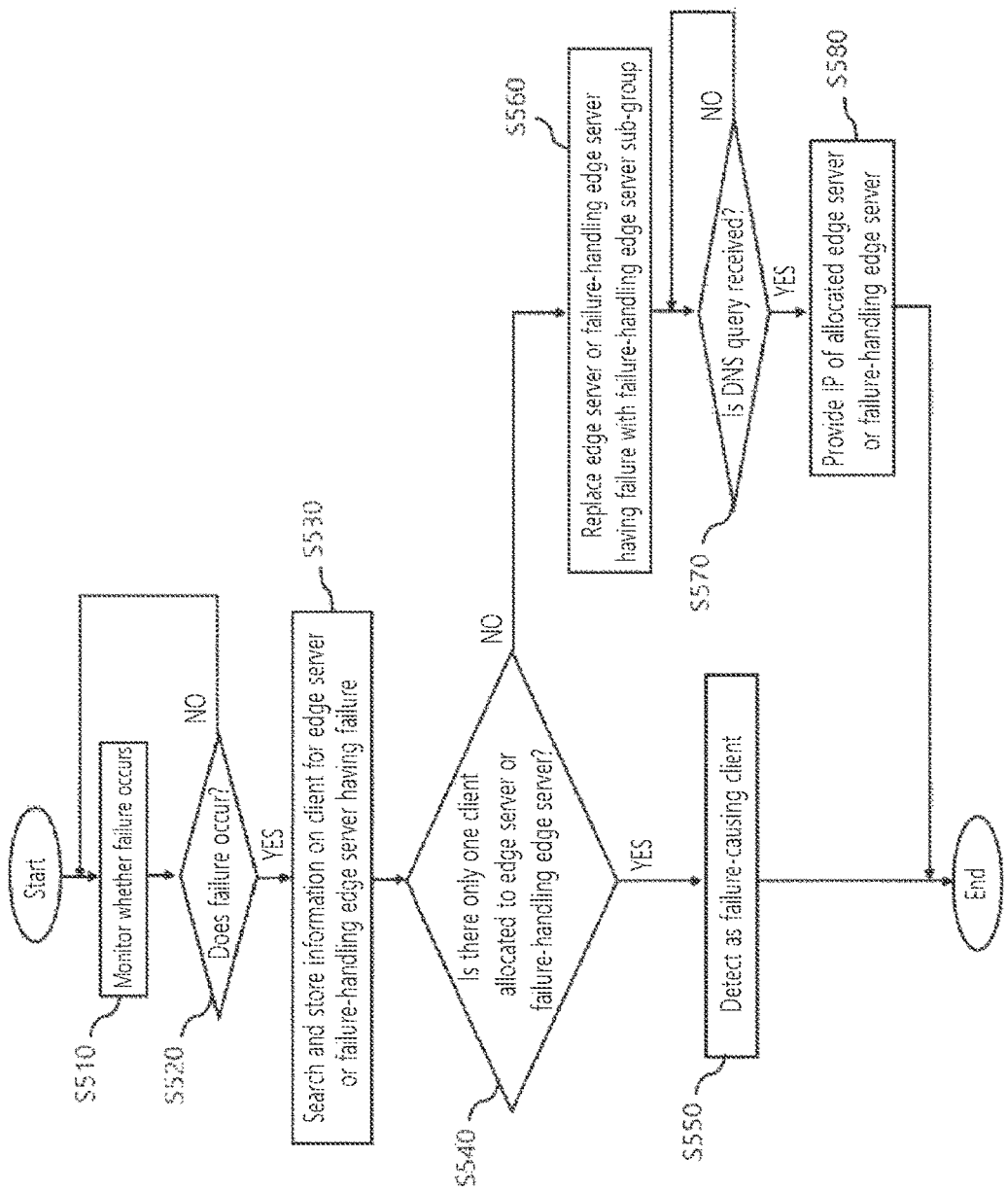
FIG. 5 illustrates a flow chart of an example, in which whether a failure occurs in the edge server or failure-handling edge server is checked, regardless of whether a DNS query is received from the client, and the edge server or failure-handling edge server having the failure is replaced by a failure-handling edge server sub-group to detect a failure-causing client.

FIG. 5 illustrates a flow chart of an example, in which whether a failure occurs in the edge server or failure-handling edge server is checked, regardless of whether a DNS query is received from the client, and the edge server or failure-handling edge server having the failure is replaced by a failure-handling edge server sub-group to detect a failure-causing client. In addition, when the edge server of failure-handling edge server having a failure is replaced by a failure-handling edge server sub-group and then a failure occurs in the edge server of failure-handling edge server, a client IP or user information using the edge server of failure-handling edge server having the failure may be searched, and when a DNS query request is received, a failure-handling edge server selected from the failure-handling edge server group may be provided to the found client.

Referring to FIGS. 2 and 5, the failure check unit 240 monitors whether a failure occurs in an edge server or failure-handling edge server, regardless of whether a DNS query is received, in operation S510.

As a result of the monitoring, when a failure occurs in the edge server or failure-handling edge server in operation S520, the edge server controller 250 searches for a client, which is using the edge server or failure-handling edge server having the failure as a route to access the service server 280, and the edge server controller 250 stores information on the client in operation S530.

Then, it is checked whether there is a single client allocated to the edge server or failure-handling edge server in operation S540. When there is a single client allocated to the edge server or failure-handling edge server, the corresponding client is detected as a failure-causing client in operation S550. When there is a plurality of clients allocated to the edge server or failure-handling edge server, the edge server or failure-handling edge server having the failure is replaced by a failure-handling edge server group in operation S560.

Then, when a DNS query is received from the found client in operation S570, the DNS controller 230 provides an IP of the allocated edge server or failure-handling edge server to the client requesting the DNS query in operation S580.

Meanwhile, the clients include agents 212 and 214 each transmitting a DNS query to connect to a failure-handling edge server selected from the failure-handling edge server group when a failure occurs in the edge server or failure-handling edge server, and the agents 212 and 214 may each request a DNS query including user information. User information that can be included in the DNS query includes information for identifying a user or information for identifying equipment, and may include information on at least one of a login ID, a device ID (MAC, CPU ID, HDD Serial, etc), a phone number, and an IP address.

When a DNS query is received from an agent of the client, the edge server controller 250 may extract user information from the DNS query of the client and may provide an IP of a failure-handling edge server selected from the failure-handling edge server group and corresponding to the extracted user information to the client.

Figure 6:
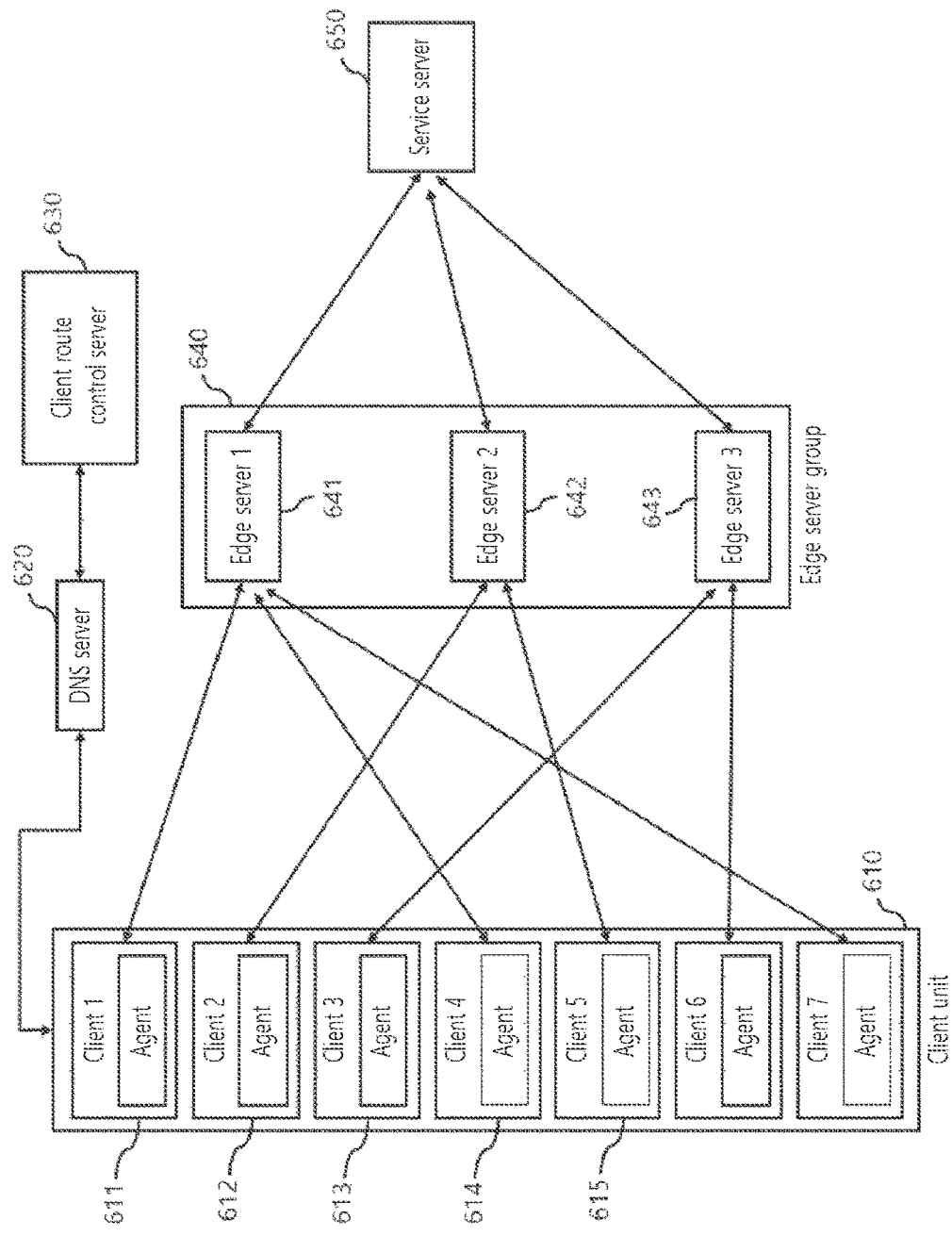
FIG. 6 illustrates an edge server allocating method according to an embodiment of the present disclosure.

Meanwhile, the method and system for detecting a failure-causing client with failure-handling edge server grouping according to an embodiment of the present disclosure will be described in more detail. First, in an embodiment of the present disclosure, edge server allocation may be performed as follows. FIG. 6 illustrates an edge server allocating method according to an embodiment of the present disclosure. Referring to FIG. 6, when a client 610 requests information on a service server 650 through a DNS server 620, a DNS server 620 transmits a DNS request of the client 610 to a client route control server 630. An edge server allocator (not shown) of the client route control server 620 allocates requesting clients in order to edge servers in a managed edge server group 640. A client 1 611 is allocated to an edge server 1 641, a client 2 612 is allocated to an edge server 2 642, and a client 3 613 is allocated to a third edge server 643. When client requests in number than the number of edge servers in the edge server group 640 are received, the edge servers in the edge server group are allocated again from the beginning. When there are three edge servers in the edge server group, the edge server 1 641 is allocated to a client 4 614 and the edge server 2 642 is allocated to a client 5 615 even though the edge servers 1, 2, and 3 are already allocated to the clients 1, 2, and 3. Clients that have already been allocated may continue to use the corresponding allocated edge servers. An edge server may be able to accommodate one or more clients, and the maximum capacity of an edge server depends on system performance of the edge server.

Figure 7:
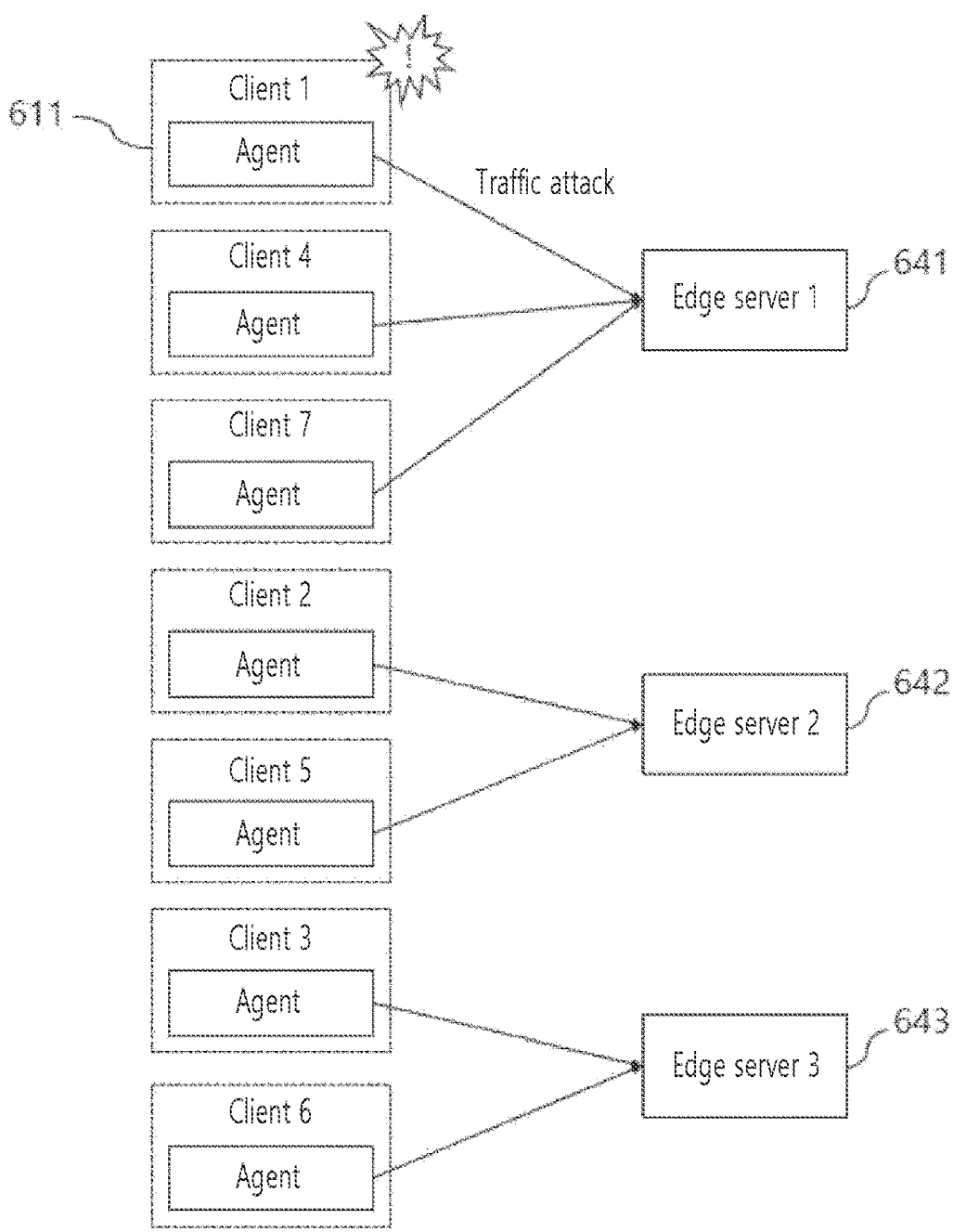
FIG. 7 illustrates a case in which a client 1 becomes a failure-causing client due to a malicious code or hacking.

In addition, after an edge server is allocated, when a failure occurs in the edge server, a failure-causing client may be detected as follows. FIG. 7 illustrates a case in which the client 1 611 becomes a failure-causing client due to a malicious code or hacking. Referring to FIG. 7, when the edge server 1 641 connected to the clients 1, 4, and 7 is under a traffic attack, the edge server 1 641 becomes unstable. In this case, the edge server 1 641 transmits communication-related information such as system information, traffic information, client connection information, and the like to a failure check unit (not shown) of the client route control server 630, and the failure check unit (not shown) of the client route control server 630 transmits the corresponding information to an edge server controller (not shown) of the client route control server 630.

Figure 8:
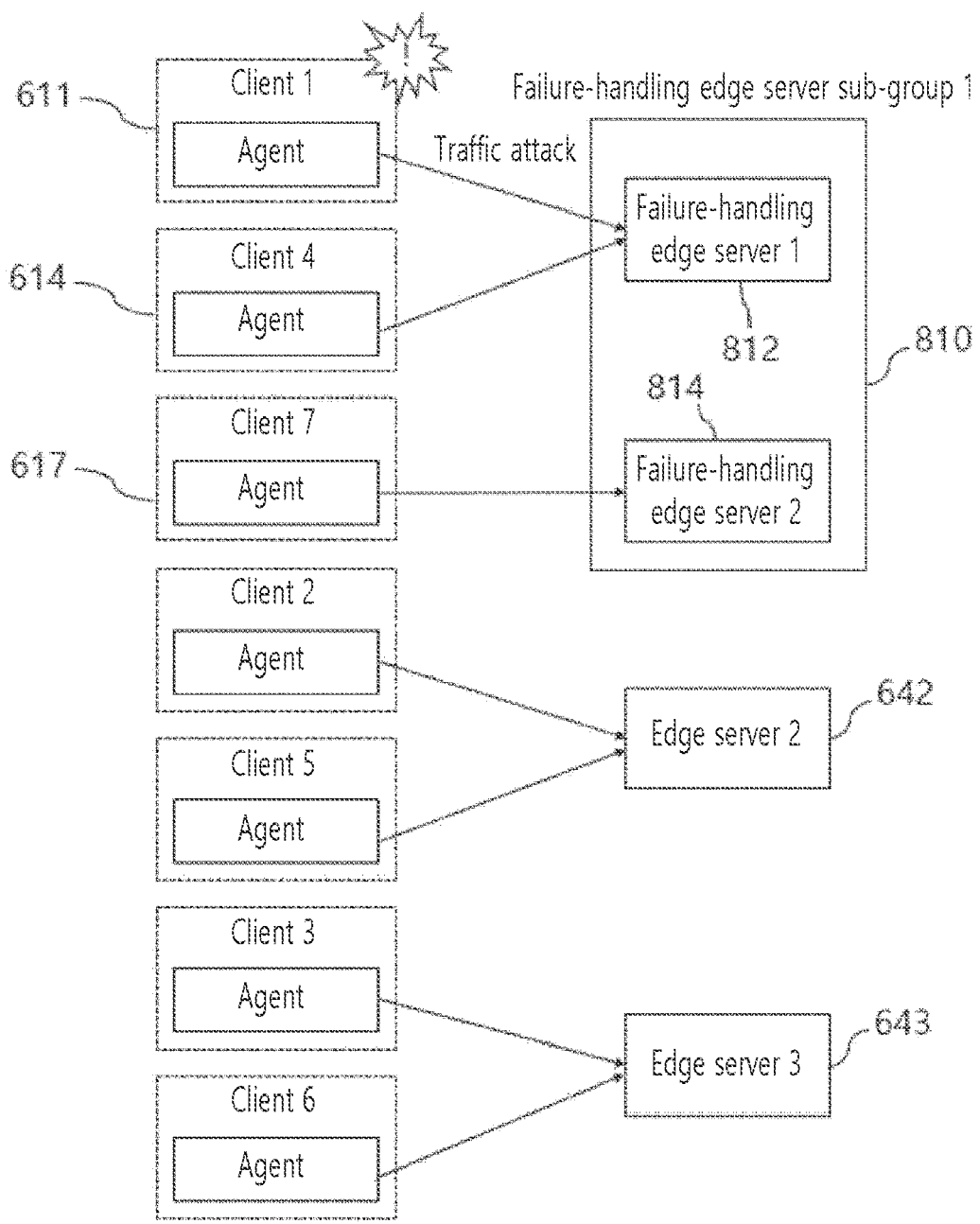
FIG. 8 illustrates a case in which clients 1, 4, and 7 are allocated to a failure-handling edge server sub-group 1 so that clients connected to an edge server 1 under an attack correspond to failure-handling edge servers.

FIG. 8 illustrates that the clients 1, 4, and 7 are allocated to the failure-handling edge server sub-group 1 810 so that the clients connected to the edge server 1 641 under an attack correspond to failure-handling edge servers. Referring to FIG. 8, after the number (three) of clients connected to the edge server 1 641 having the failure is checked through a failure-handling edge server sub-group control mechanism of an edge server controller (not shown), a failure-handling edge server sub-group 1 810 is logically generated in a failure-handling edge server group (not shown), a failure-handling edge server 1 812 and a failure-handling edge server 2 814 are added to the corresponding failure-handling edge server sub-group 1 810 and then allocated to the failure-handling edge server sub-group 1 810.

When a DNS request for edge server re-allocation is received from the client 1 611, the client 4 614, and the seventh client 617 allocated to the edge server 1 641, the edge server allocator (not shown) of the client route control server 630 allocates the client 1 611, the client 4 614, and the seventh client 617 to a failure-handling edge server in the failure-handling edge server sub-group 810 not belonging to the edge server group, but belonging to the failure-handling edge server group. Here, it is assumed that there are two failure-handling edge servers 812 and 814 in the failure-handling edge server sub-group 1 810 (it is assumed that there are two failure-handling edge servers in the failure-handling edge server sub-group 1 810 according to a failure-handling edge server sub-group control mechanism).

Since there are three clients (the clients 1, 4, and 7) allocated to the edge server 1 641, the client 1 611 and the client 4 614 are allocated to the failure-handling edge server 1 812 and the seventh client 617 is allocated to the failure-handling edge server 2 814. A system status of the failure-handling edge server 1 812 connected to the clients 1 and 4 becomes unstable due to the traffic attack from the client 1 611. The failure-handling edge server 1 812 transmits communication-related information to the failure check unit (not shown) of the client route control server 630. The failure check unit (not shown) of the client route control server 630 transmits the corresponding information to the edge server controller (not shown) of the client route control server 630. Here, a failure-causing client detection mechanism in the edge server controller of the client route control server defers making a determination since it is not yet the time when failure-handling edge servers and clients are allocated one by one.

Then, the clients connected to the failure-handling edge server 1 812 of the failure-handling edge server group 1 810 under the attack are separated from each other, a failure-handling edge server sub-group 2 910 is logically created through the failure-handling edge server sub-group control mechanism of the edge server controller (not shown), and a failure-handling edge server 3 912 and a failure-handling edge server 4 914 are added to the failure-handling edge server sub-group 2 910 and then allocated to the failure-handling edge server sub-group 2 910.

Figure 9:
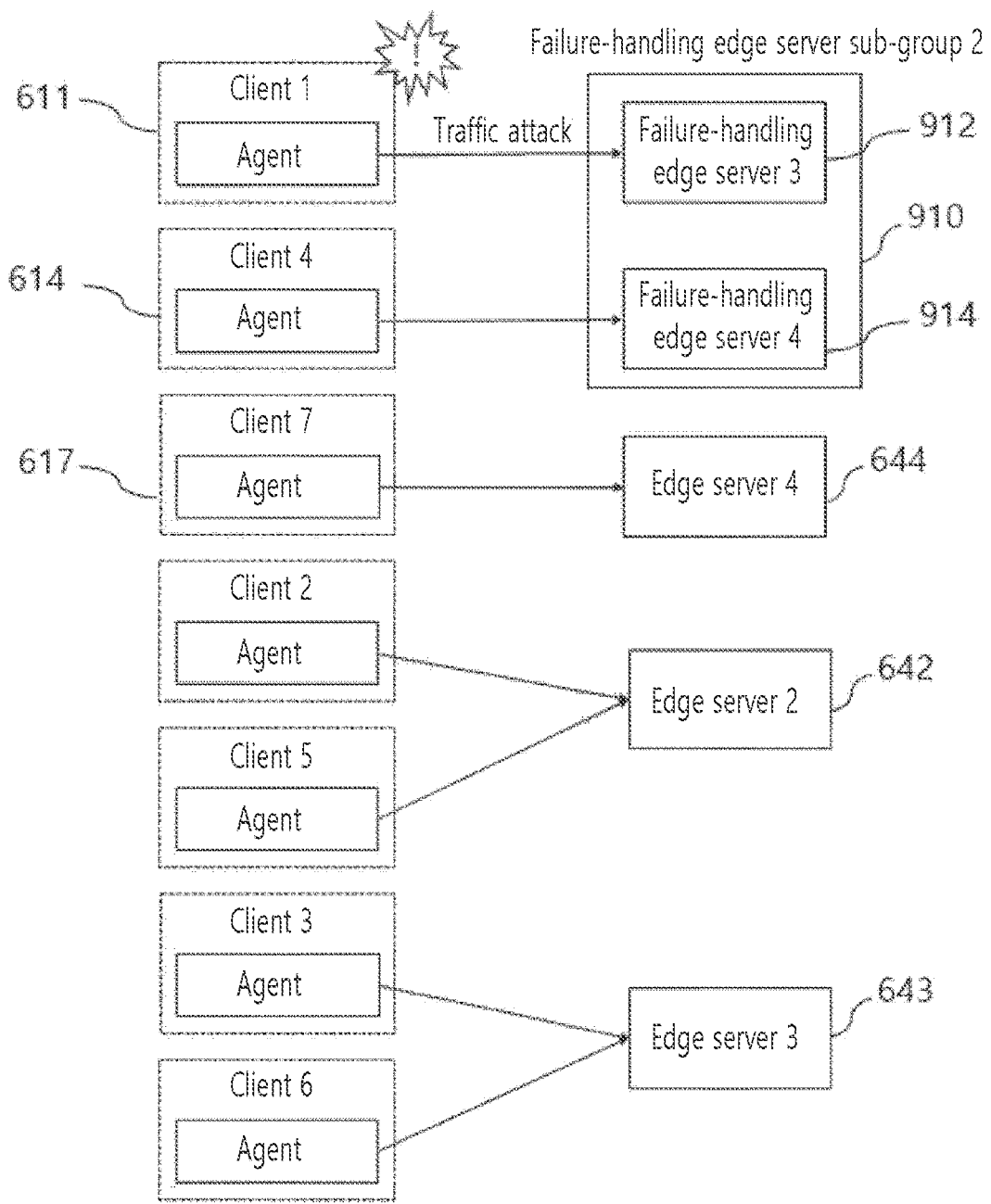
FIG. 9 illustrates a case in which clients 1 and 4 are separated and re-allocated to the failure-handling edge server sub-group 2.

FIG. 9 illustrates that the client 1 611 and the client 4 614 are separated and re-allocated to the failure-handling edge server sub-group 2 910. Referring to FIG. 9, when the client 1 611 and the client 4 614 allocated to the failure-handling edge server 1 812 of the failure-handling edge server sub-group 1 810 make a DNS request in order to be re-allocated to edge servers, the edge server allocator (not shown) of the client route control server 630 allocates the client 1 611 and the client 4 614 to a failure-handling edge server not belonging to the failure-handling edge server sub group 1 810, but belonging to the failure-handling edge server sub group 2 910. Here, it is assumed that there are two failure-handling edge servers 912 and 914 in the failure-handling edge server sub-group 2 910 (it is assumed that two failure-handling edge servers are included in the failure-handling edge server 2 according to the failure-handling edge server sub-group control mechanism).

In addition, since the seventh client 617 connected to the failure-handling edge server 2 814 of the failure-handling edge server sub-group 1 810 is not subject to a failure-causing client, the edge server allocator (not shown) of the client route control server 630 allocates the seventh client 617 to a fourth edge server 644, which is a new edge server of the edge server group. It is possible to allocate the corresponding client either to an empty edge server or to an edge server that has enough systematic space among edge servers having clients already allocated thereto.

Since there are two clients (the clients 1 and 4) allocated to the failure-handling edge server 1 812 of the failure-handling edge server sub-group 1 810 and there are also two failure-handling edge server belonging to the failure-handling edge server sub-group 2 910, the client 1 611 is allocated to the failure-handling edge server 3 912 and the client 4 614 is allocated to the failure-handling edge server 4 914. The edge server allocator (not shown) of the client route control server 630 transmits corresponding allocation information to a failure-causing client detector (not shown) of the client route control server 630. A system status of the failure-handling edge server 3 912 connected with the client 1 611 becomes unstable due to the traffic attack from the client 1 611. The failure-handling edge server 3 912 transmits communication-related information to the failure check unit (not shown) of the client route control server 630, and the failure check unit (not shown) of the client route control server 630 transmits the corresponding information to the edge server controller (not shown) of the client route control server 630.

Figure 10:
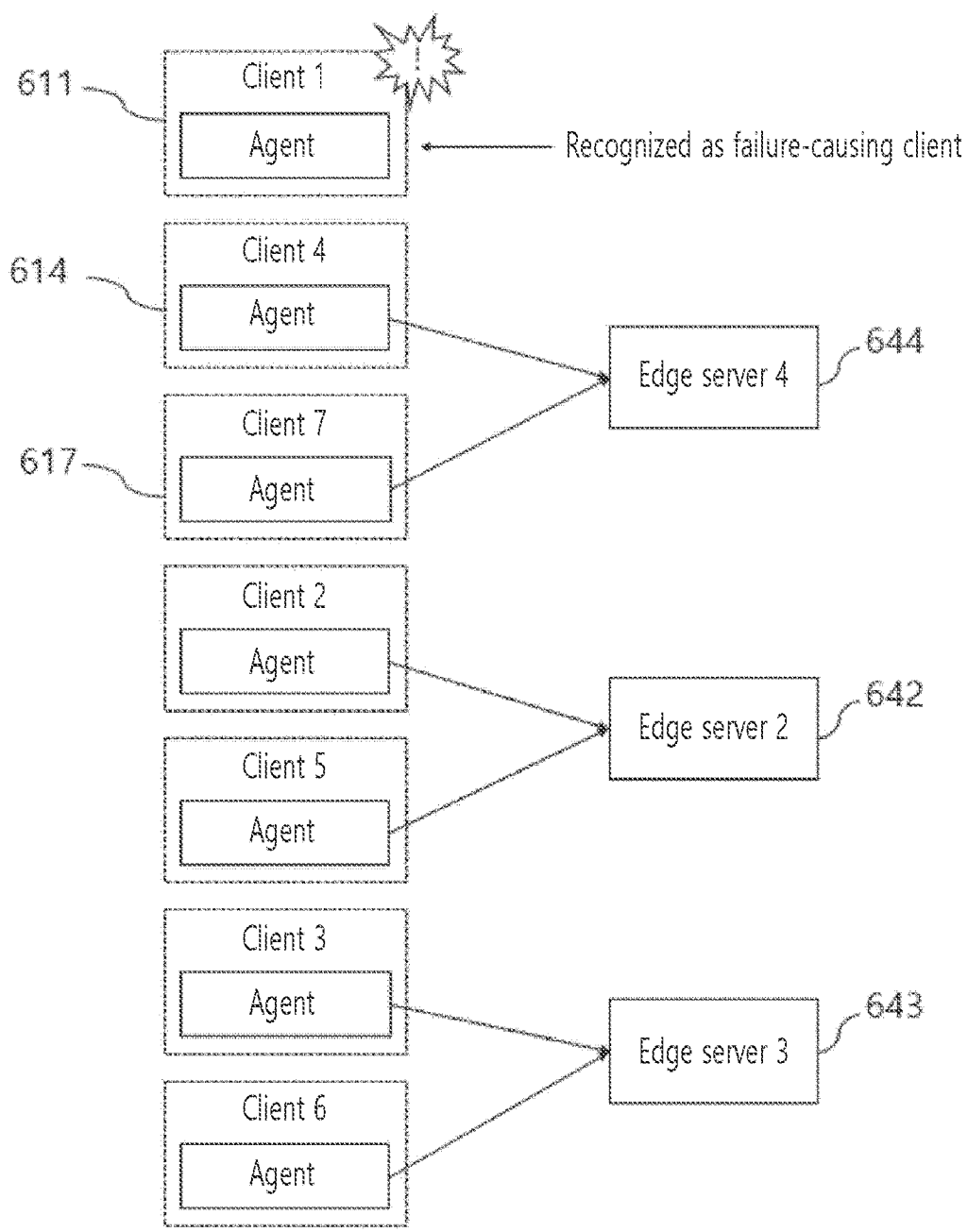
FIG. 10 illustrates a process of recognizing a client connected to one failure-handling edge server and attacking the corresponding failure-handling edge server as a failure-causing client.

FIG. 10 illustrates a process of recognizing a client connected to one failure-handling edge server and attacking the corresponding failure-handling edge server as a failure-causing client. Referring to FIG. 10, in the failure-causing client detector (not shown) of the client route control server 630, failure-handling edge servers and clients are allocated one by one, and the client 1 611 connected to the failure-handling edge server 1 812 is recognized as a failure-causing client since the failure-handling edge server 1 812 has caused a failure. The failure-causing client detector (not shown) of the client route control server 630 records the client 1 611 in a blacklist and transmits corresponding information to the edge server allocator (not shown) of the client route control server 630. In addition, since the client 4 614 is not a failure-causing client, the edge server allocator (not shown) of the client route control server 630 may allocate the fourth client 4 614 to the fourth edge server 644 having an enough systematic space among the edge servers in the edge server group.

Even if the client 1 611, which is a failure-causing client and registered in the blacklist, makes a DNS request to request information from the service server 650 again, the edge server allocator (not shown) of the client route control server 630 does not allocate any edge server but instead transmits a Null response, so that the client 1 611 is not allocated to any edge server nor able to access the service server 650.

Meanwhile, the difference between a related art relating to a method for detecting a failure-causing client using a client route control system and the present disclosure relating to a method for detecting a failure-causing client with failure-handling edge server grouping will be described in more detail.

There is no significant difference between the related art and the method according to the present disclosure if a failure occurs only in a single client; however, if a failure occurs in several clients simultaneously, there are differences in terms of the method and accuracy of detection and the present disclosure is able to detect a failure-causing client without false detection.

Figure 11:
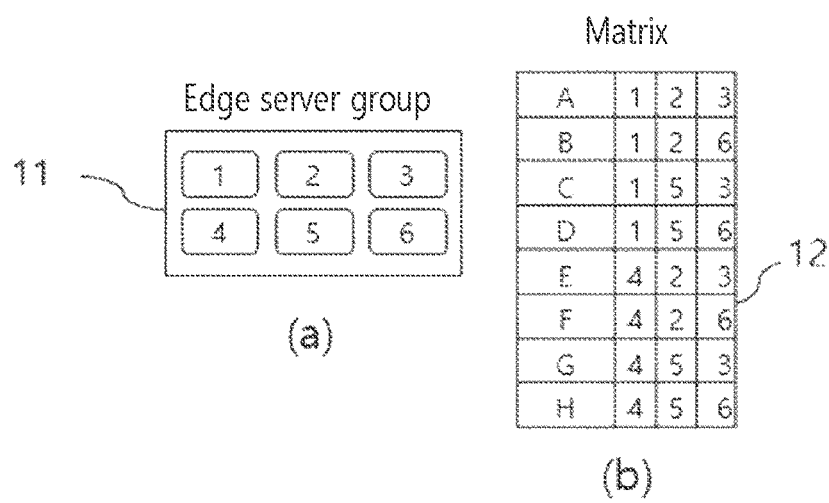
FIGS. 11 and 12 are diagrams for explaining a method of detecting a failure-causing client using a client route control system, which is the related art of the present disclosure.
Figure 12:
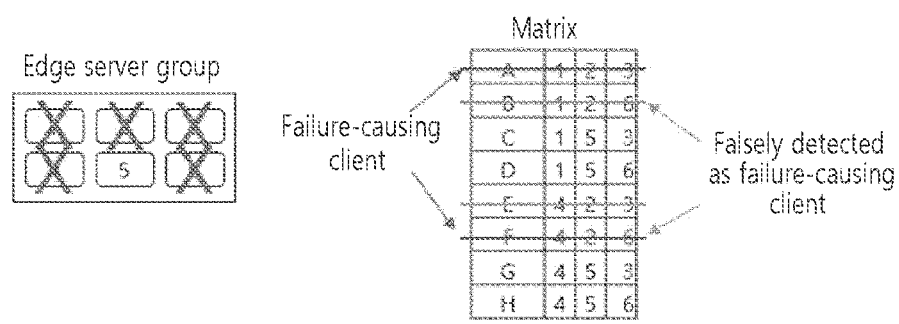

FIGS. 11 and 12 are diagrams for explaining a method of detecting a failure-causing client using a client route control system, which is the related art of the present disclosure. FIGS. 13 to 16 are diagrams for explaining a method of detecting a failure-causing client with failure-handling edge server grouping according to the present disclosure.

As described above in the background art of the present disclosure, referring to FIG. 11, assuming that a matrix 12 for detecting a failure-causing client is configured in a 3×2 matrix arrangement for an edge server group 11 composed of six edge servers, the configuration is as follows. In a case where edge servers as in the above matrix are allocated to clients A to H, if the clients A and F are failure-causing clients, edge servers 1, 2, 3, 4, and 6 in an edge server group fail due to the clients A and F.

However, in the matrix shown in FIG. 12, not only the clients A and F, but also other clients allocated to edge servers 1, 2, 3, 4, and 6 each having a failure in the edge server group are also designated as failure-causing clients, so there is a problem that even the clients B and E are recognized as failure-causing clients. That is, the clients B and E may be falsely detected as failure-causing clients.

Figure 13:
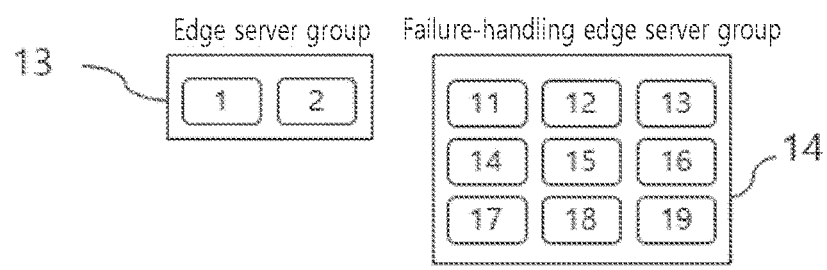
FIGS. 13 to 16 are diagrams for explaining a method of detecting a failure-causing client with failure-handling edge server grouping according to the present disclosure.

Meanwhile, the method of detecting a failure-causing client with failure-handling edge server grouping according to the present disclosure will be described in comparison with the related art. It is assumed that the clients A to H are provided in the same way as in the matrix method and that two edge servers 1 and 2 exist in an edge server group 13 for grouping and nine failure-handling edge servers 11 to 19 exists in a failure-handling edge server group 14, as shown in FIG. 13.

Figure 14:
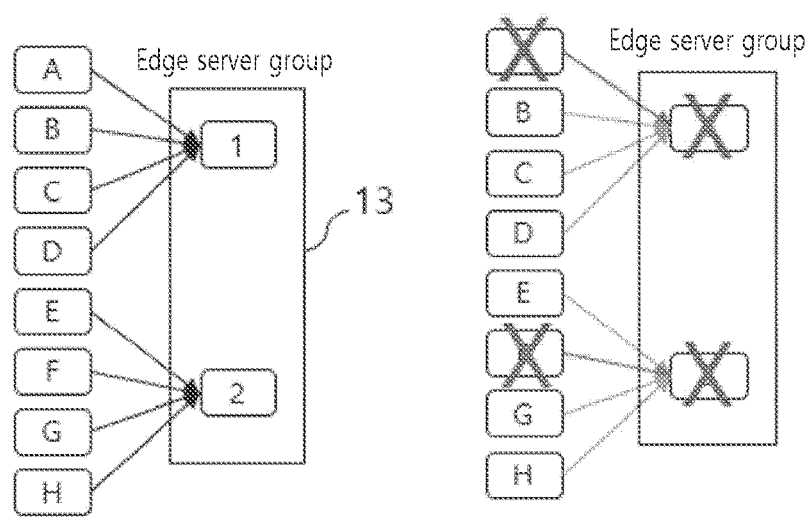

Referring to FIG. 14, since there are only two edge servers in the edge server group, the clients A to H are allocated to an edge server as shown in FIG. 14. In this case, if the clients A and F among the clients A to H are failure-causing clients, a failure occurs both the edge server 1 and 2 in the edge server group 13.

Edge server sub-groups 1 and 2 may be generated first in the failure-handling edge server group by a failure-handling edge server sub-group control mechanism and an edge server grouping allocation mechanism of the edge server controller (not shown). The failure-handling edge servers 11 and 12 are included in the failure-handling edge server group 1, and the failure-handling edge servers 13 and 14 are included in in the failure-handling edge server group 2. In addition, the clients A to H allocated to the edge servers 1 and 2 having the failure are allocated to the failure-handling edge server sub-groups 1 and 2, as shown in FIG. 15.

Figure 15:
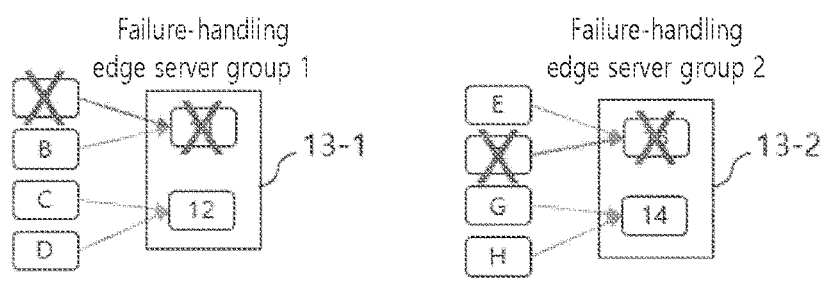

Referring to FIG. 15, since the failure-causing clients, Client A and Client F, are allocated to the failure-handling edge server 11 of a failure-handling edge server sub-group 1 13-1 and the failure-handling edge server 13 of a failure-handling edge server sub-group 2 13-2, the corresponding failure-handling edge servers fail.

A failure-handling edge server sub-group 3 13-3 and a failure-handling edge server sub-group 4 13-4 are generated by the failure-handling edge server sub-group control mechanism and the edge server grouping allocation mechanism of the edge server controller (not shown). Among the generated and unallocated failure-handling edge servers as shown in FIG. 16, the failure-handling edge servers 15 and 16 are allocated to a failure-handling edge server sub-group 3 13-3 and the failure-handling edge servers 17 and 18 are allocated to a failure-handling edge server sub-group 4 13-4, and the clients A, B, E, and F connected to the failure-handling edge servers 11 and 13 having the failure are allocated to the failure-handling edge servers 15, 16, 17, and 18.

Figure 16:
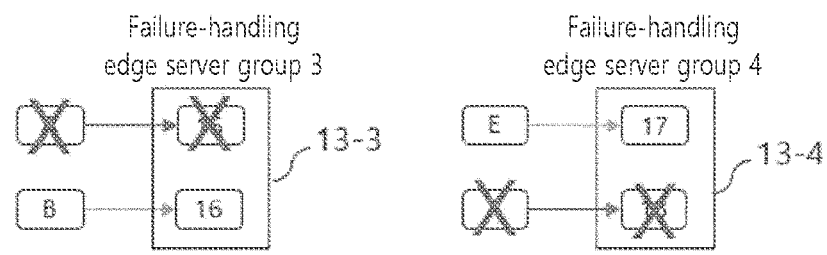

Referring to FIG. 16, the failure-handling edge server 15 of the failure-handling edge server sub-group 3 13-3 and the failure-handling edge server 18 of the failure-handling edge server sub-group 4 13-4 have failed, and since the clients and the failure-handling edge servers are mapped one by one, the client A allocated to the failure-handling edge server 15 and the client F allocated to the failure-handling edge server 18 are determined as failure-causing clients. As described above, in the method according to the present disclosure, only the clients A and F are detected as the failure-causing clients, whereas the clients B and E, which are falsely detected by the conventional method, are not detected as the failure-causing clients.

Figure 17:
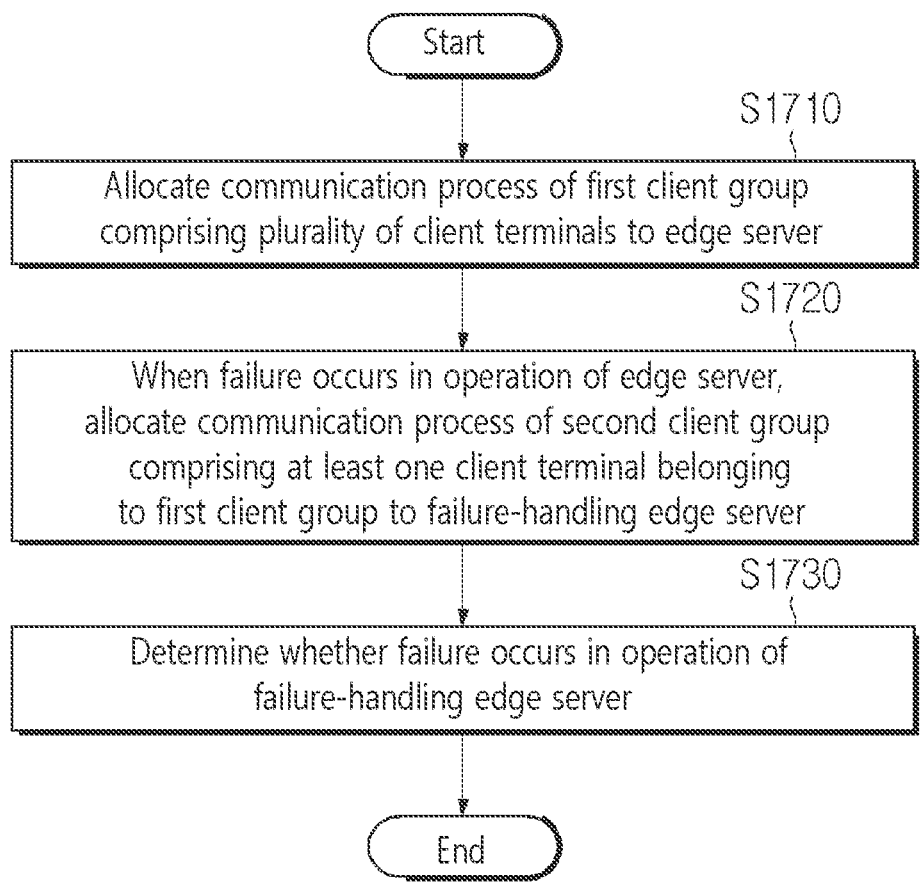
FIGS. 17 to 18 are diagrams for explaining a method for detecting a failure-causing client according to an embodiment.

Hereinafter, a method in which a client terminal access control apparatus according to an embodiment performs client terminal performs a client terminal access control using the above-described method for detecting a failure-causing client will be described with reference to FIG. 17. The client terminal access control apparatus may include: a communication unit configured to perform data communication with at least one of a client terminal, an edge server, and an failure-handling edge server; and a processor configured to perform the following operations.

First, the client terminal access control apparatus may allocate a communication process of a first client group including a plurality of client terminals to an edge server in operation S1710. Next, when a failure occurs in the operation of the edge server, the client terminal access control apparatus may allocate a communication process of a second client group including at least one client terminal belonging to the first client group to a failure-handling edge server in operation S1720. Here, the second client group may be configured to include only at least one client terminal belonging to the first client group. Alternatively, the second client group may be configured to further include another client terminal together with at least one client terminal belonging to the first client group.

Next, the client terminal access control apparatus may determine whether a failure occurs in the operation of the failure-handling edge server in operation S1730. The client terminal access control apparatus may control access of a client terminal according to whether a failure occurs. For example, when a failure occurs in the operation of the failure-handling edge server and the number of client terminals allocated to the failure-handling edge server is greater than or equal to a predetermined number, the client terminal access control apparatus may allocate a communication process of a sub client group including at least one client terminal belonging to a client group allocated to the failure-handling edge server to a failure-handling edge server. For example, the client terminal access control apparatus may allocate the communication process of the sub client group to a failure-handling edge server in which no failure occurs. Here, the predetermined number may be one or two or may be any other set value.

In more detail, the client terminal access control apparatus may generate a sub client group including at least one client terminal belonging to the client group allocated to the failure-handling edge server, and may allocate a communication process of the generated sub client group to a failure-handling edge server. As described above, the sub client group may be configured to include only at least one client terminal belonging to the client group allocated to the failure-handling edge server having the failure. Alternatively, the sub client group may be configured to further include another client terminal together with at least one client terminal belonging to the client group allocated to the failure-handling edge server having the failure.

Meanwhile, when a failure occurs in the operation of the failure-handling edge server and the number of client terminals allocated to the failure-handling edge server is a predetermined number, the client terminal access control apparatus may determine the predetermined number of client terminals as failure-causing client terminals.

Figure 18:
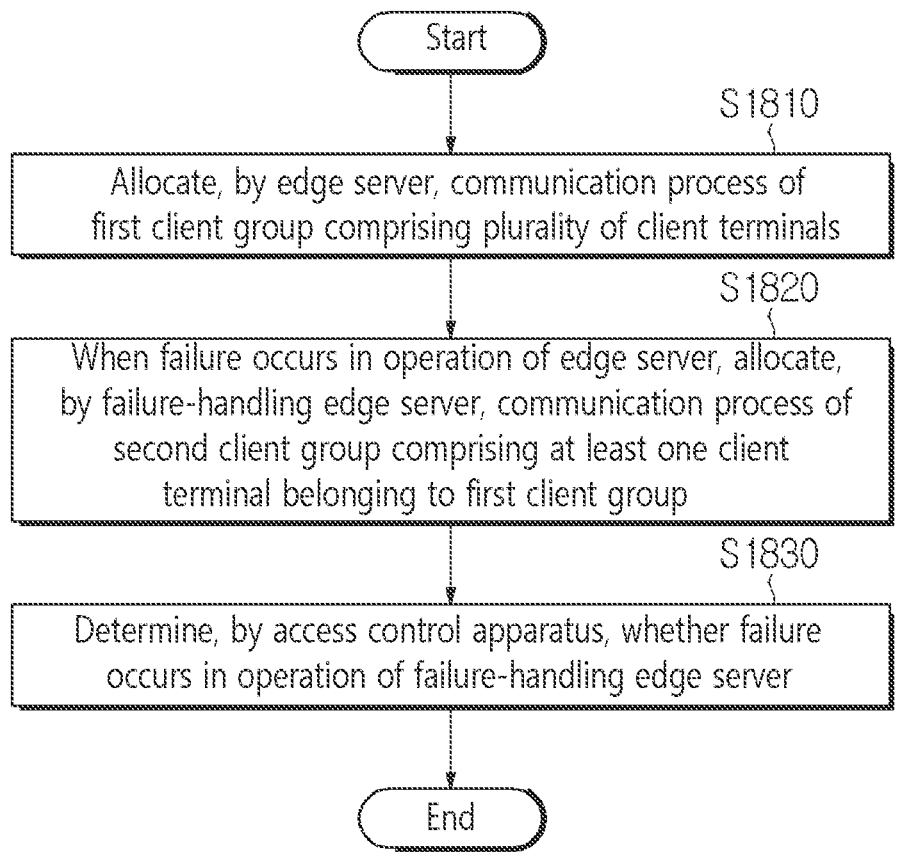

Hereinafter, a method in which a client terminal access control system according to an embodiment performs a client terminal access control using the above-described method for detecting a failure-causing client will be described with reference to FIG. 18. The client terminal access control system may include an edge server, a failure-handling edge server, and an access control device.

First, an edge server may perform a communication process of a first client group including a plurality of client terminals in operation S1810. Next, when a failure occurs in the operation of the edge server, a failure-handling edge server may perform a communication process of a second client group including at least one client terminal belonging to the first client group in operation S1820.

Next, the access control apparatus may determine whether a failure occurs in the operation of the failure-handling edge server in operation S1830. Then, the access control apparatus may control access of a client terminal according to whether a failure occurs. For example, when a failure occurs in the operation of the failure-handling edge server and the number of client terminals allocated to the failure-handling edge server is a predetermined number, the access control apparatus may allocate a communication process of a sub client group including at least one client terminal belonging to a client group allocated to the failure-handling edge server to a failure-handling edge server. For example, the access control device may allocate the communication process of the sub client group to a failure-handling edge server in which no failure occurs. Here, the predetermined number may be one or two or may be any other set value.

Meanwhile, when a failure occurs in the operation of the failure-handling edge server and the number of client terminals allocated to the failure-handling edge server is a predetermined number, the access control apparatus may determine the predetermined number of client terminals as failure-causing client terminals.

The method, apparatus, and system according to the above-described embodiment may be implemented as computer (any device having an information processing function)-readable codes on a computer-readable recording medium. The computer-readable recording medium includes all types of recording devices in which data readable by a computer system is stored. Examples of the computer-readable recording medium may include read-only memories (ROMs), random-access memories (RAMs), compact disk read-only memories (CD-ROMs), magnetic tapes, floppy disks, optical data storage devices, and the like.

Although the inventive concept has been described with reference to the embodiments illustrated in the drawings, this is merely an example and those of ordinary skill in the art will understand that various modifications and other equivalent embodiments may be derived therefrom. Thus, the spirit and scope of the inventive concept should be defined by the appended claims.

INDUSTRIAL APPLICABILITY

The present disclosure may be used to detect a client that causes a network failure.

DETAILED DESCRIPTION OF MAIN ELEMENTS

100: client unit
102, 104: client
14: agent
110: DNS server
120: client route control server
130: service relay network
132: edge server group
134: failure-handling edge server group
140: service server
20: client route control server
210: client
210-1: client 1
212: agent
201-*n*: client n
124: agent
220: DNS server
230: DNS controller
240: failure check unit
250: edge server controller
252: edge server allocator
254: failure-handling edge server sub-group controller
256: failure-causing client detector
260: edge server group
260-1: edge server 1
260-*n*: edge server n
270: failure-handling edge server group
275: failure-handling edge server sub-group
270-1: failure-handling edge server 1
270-*m*: failure-handling edge server m
270-*n*-*m*: failure-handling edge server n-m
270-*n*: failure-handling edge server n
610: client unit
611: client 1
612: client 2
613: client 3
614: client 4
615: client 5
620: DNS server 630: client route control server
640: Edge server group
641: first edge server
642: second edge server
643: third edge server
644: fourth edge server
650: service server
810: failure-handling edge server sub-group 1
812: failure-handling edge server 1
814: failure-handling edge server 2
910: failure-handling edge server sub-group 2
912: failure-handling edge server 3
914: failure-handling edge server 4
11: edge server group
12: edge server allocation matrix
13: edge server group
14: failure-handling edge server group
13-1: failure-handling edge server sub-group 1
13-2: failure-handling edge server sub-group 2
13-3: failure-handling edge server sub-group 3
13-4: failure-handling edge server sub-group 4

What is claimed is:

1. A client terminal access control method performed by a client terminal access control apparatus, the method comprising:
    allocating a communication process of a first client group comprising a plurality of client terminals to a server;
    when a failure occurs in an operation of the server, allocating a communication process of a second client group comprising at least one client terminal belonging to the first client group to a failure-handling server;
    determining whether a failure occurs in an operation of the failure-handling server; and
    when a failure occurs in the operation of the failure-handling server, determining, based on a number of client terminals allocated to the failure-handling server, which process to proceed with, either the first process or the second process,
    wherein the first process is determining the client terminals allocated to the failure-handling server as failure-causing client terminals,
    wherein the second process is allocating a communication process of a sub client comprising at least one client terminal allocated to the failure-handling server to another failure-handling server.

2. The client terminal access control method of claim 1, wherein, based on the number of client terminals allocated to the failure-handling server is greater than a predetermined number, the second process is determined to be proceeded.

3. The client terminal access control method of claim 1, wherein, based on the number of client terminals allocated to the failure-handling server is not greater than a predetermined number, the first process is determined to be proceeded.

4. The client terminal access control method of claim 2, wherein the predetermined number is 1.

5. A client terminal access control apparatus comprising:
    a communication unit configured to perform data communication with a server and a failure-handling server; and
    a processor configured to
        allocate a communication process of a first client group comprising a plurality of client terminals to a server,
        when a failure occurs in an operation of the server, allocate a communication process of a second client group comprising at least one client terminal belonging to the first client group to a failure-handling server,
        determine whether a failure occurs in the operation of the failure-handling server; and
        when a failure occurs in the operation of the failure-handling server, determine, based on a number of client terminals allocated to the failure-handling server, which process to proceed with, either the first process or the second process,
    wherein the first process is determining the client terminals allocated to the failure-handling server as failure-causing client terminals, and
    wherein the second process is allocating a communication process of a sub client comprising at least one client terminal allocated to the failure-handling server to another failure-handling server.

6. A client terminal access control method performed by a client terminal access control system having a server, a failure-handling server, and an access control device, the method comprising:
    performing, by the server, a communication process of a first client group comprising a plurality of client terminals;
    performing, by the failure-handling server, a communication process of a second client group comprising at least one client terminal belonging to the first client group when a failure occurs in an operation of the server; and
    determining, by the access control device, whether a failure occurs in an operation of the failure-handling server; and
    when a failure occurs in the operation of the failure-handling server, determining, by the access control device, based on a number of client terminals allocated to the failure-handling server, which process to proceed with, either the first process or the second process,
    wherein the first process is determining the client terminals allocated to the failure-handling server as failure-causing client terminals,
    wherein the second process is allocating a communication process of a sub client comprising at least one client terminal allocated to the failure-handling server to another failure-handling server.

7. A client terminal access control system comprising:
    a server;
    a failure-handling server; and
    an access control device,
    wherein the server performs a communication process of a first client group comprising a plurality of client terminals,
    wherein when a failure occurs in an operation of the server, the failure-handling server performs a communication process of a second client group comprising at least one client terminal belonging to the first client group,
    wherein the access control device determines whether a failure occurs in the operation of the failure-handling server, and
    wherein when a failure occurs in the operation of the failure-handling server, the access control device determines, based on a number of client terminals allocated to the failure-handling server, which process to proceed with, either the first process or the second process,
    wherein the first process is determining the client terminals allocated to the failure-handling server as failure-causing client terminals, wherein the second process is allocating a communication process of a sub client comprising at least one client terminal allocated to the failure-handling server to another failure-handling server.

8. A computer program stored in a non-transitory computer-readable recording medium to execute the method of claim 1.

9. A computer program stored in a non-transitory computer-readable recording medium to execute the method of claim 6.

10. A non-transitory computer-readable recording medium storing a computer program to execute the method of claim 1 by a computer.

11. A non-transitory computer-readable recording medium storing a computer program to execute the method of claim 6 by a computer.

* * * * *